Figure 1:
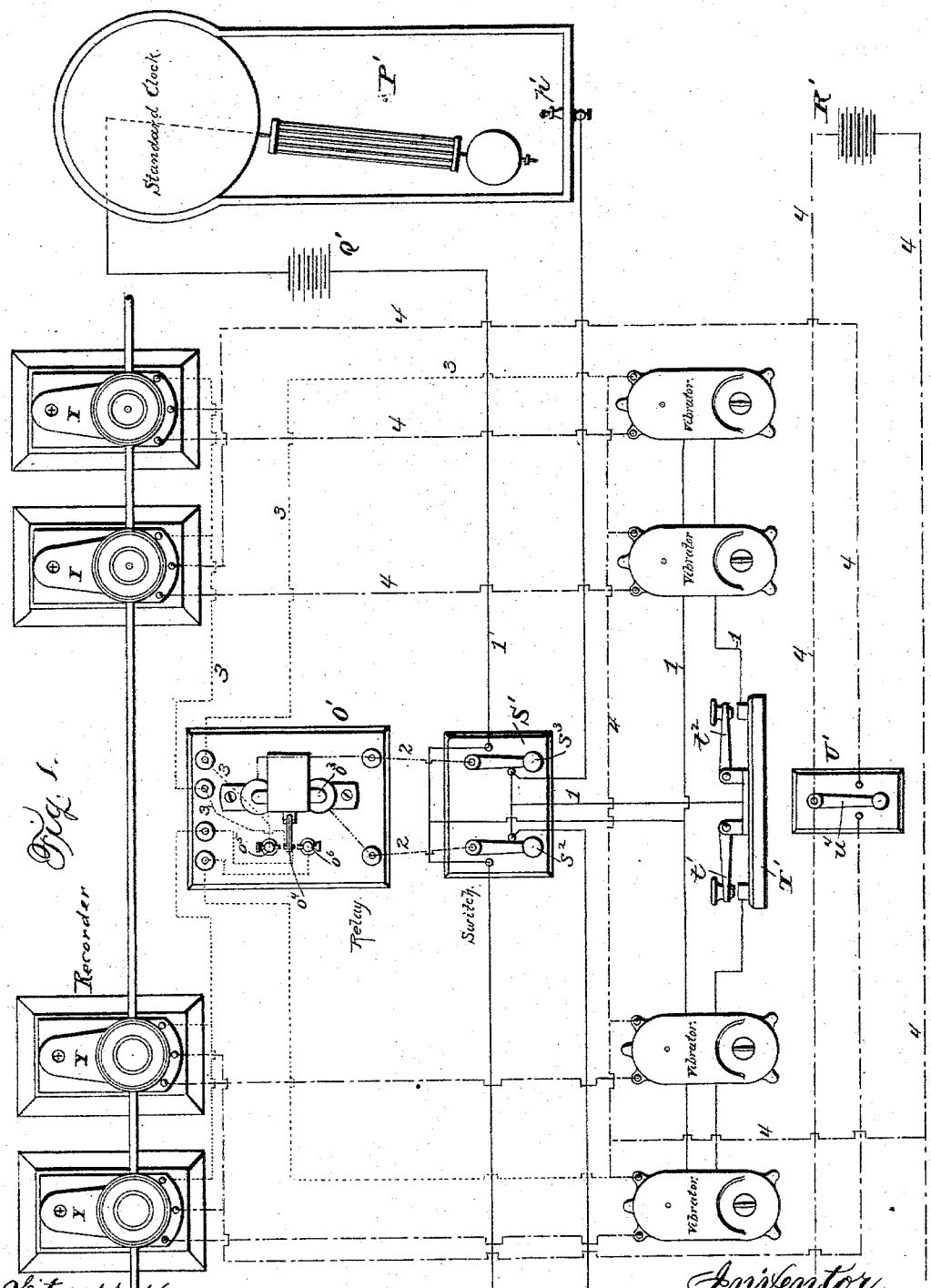

(No Model.) 17 Sheets—Sheet 1.

G. E. HUNTER.
MECHANISM FOR TESTING WATCH BALANCES AND HAIR SPRINGS.

No. 490,202. Patented Jan. 17, 1893.

Witnesses
Chas. J. Williamson.
Henry C. Hazard.

Inventor
George E. Hunter, by
Pindle and Russell, his Attorneys (No Model.)  17 Sheets—Sheet 2.

G. E. HUNTER.
MECHANISM FOR TESTING WATCH BALANCES AND HAIR SPRINGS.

No. 490,202.  Patented Jan. 17, 1893.

(No Model.) 17 Sheets—Sheet 3.

G. E. HUNTER.
MECHANISM FOR TESTING WATCH BALANCES AND HAIR SPRINGS.

No. 490,202. Patented Jan. 17, 1893.

Witnesses
Chas. J. Williamson.
Henry C. Hazard.

Inventor
George E. Hunter, by
Brindle & Russell his Attorneys (No Model.)　　　　　　　　　　　　　17 Sheets—Sheet 4.
G. E. HUNTER.
MECHANISM FOR TESTING WATCH BALANCES AND HAIR SPRINGS.

No. 490,202.　　　　　　　　　Patented Jan. 17, 1893.

Witnesses
Chas. J. Williamson.
Henry C. Hazard

Inventor
George E. Hunter, by
Brindle and Russell, his Attorneys

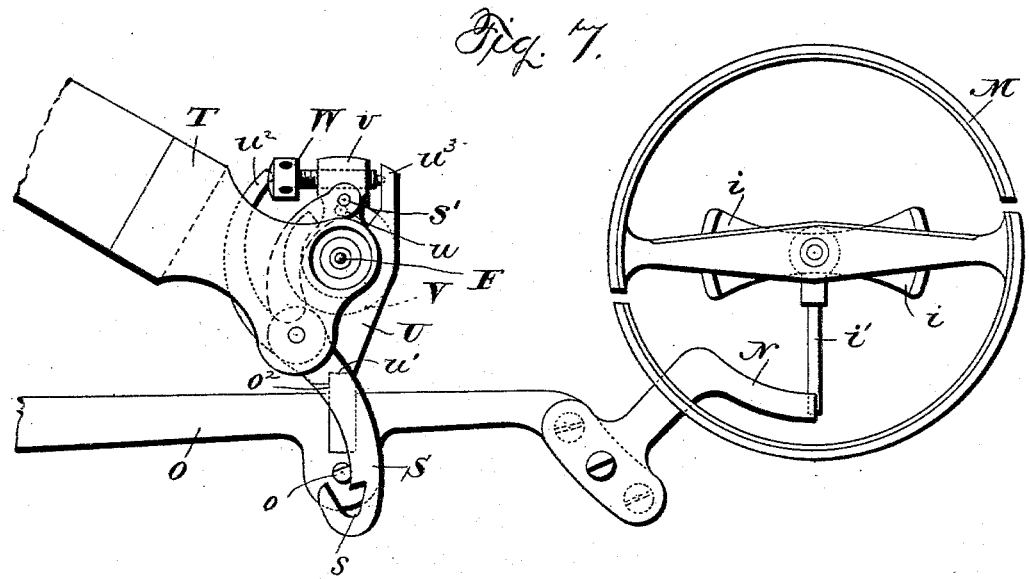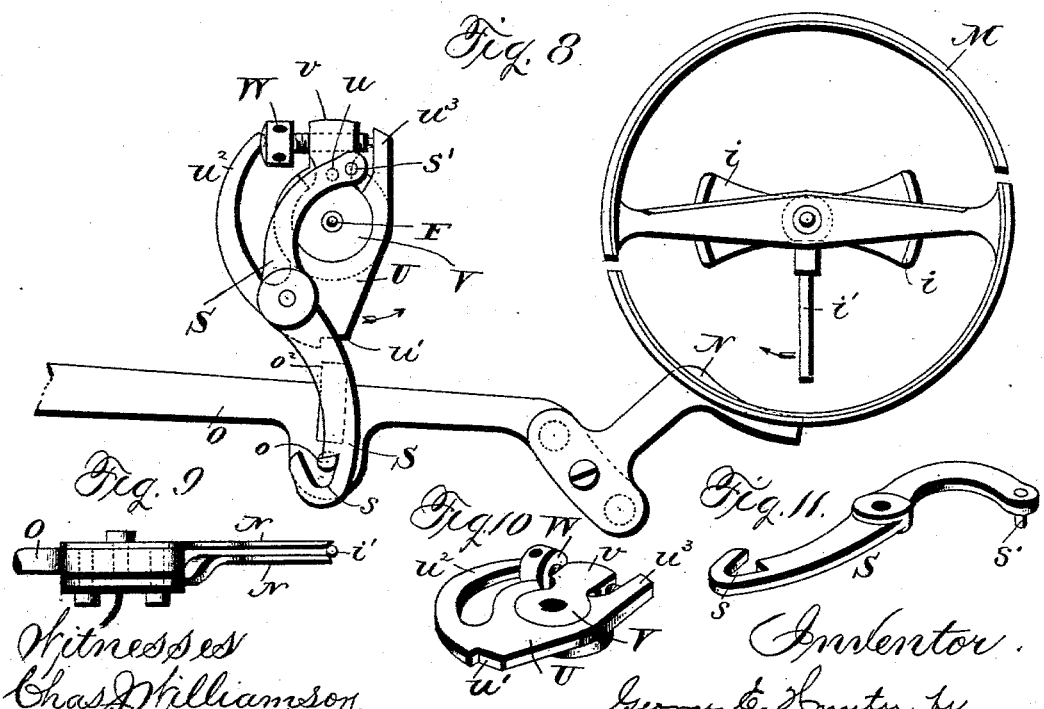

(No Model.) 17 Sheets—Sheet 6.
G. E. HUNTER.
MECHANISM FOR TESTING WATCH BALANCES AND HAIR SPRINGS.
No. 490,202. Patented Jan. 17, 1893.

Witnesses
Chas. J. Williamson.
Henry C. Hazard.

Inventor
George E. Hunter, by
Crindle and Russell, his Attorneys (No Model.)  G. E. HUNTER.  17 Sheets—Sheet 8.
MECHANISM FOR TESTING WATCH BALANCES AND HAIR SPRINGS.
No. 490,202.  Patented Jan. 17, 1893.

Witnesses
Chas. J. Williamson
Henry C. Hazard

Inventor
George E. Hunter, by
Dindle and Russell, his Attorneys (No Model.) 17 Sheets—Sheet 9.

G. E. HUNTER.
MECHANISM FOR TESTING WATCH BALANCES AND HAIR SPRINGS.

No. 490,202. Patented Jan. 17, 1893.

Witnesses
Chas. J. Williamson.
Henry C. Hazard.

Inventor
George E. Hunter, by
Rindle and Russell, his Attorneys

THE NORRIS PETERS CO., PHOTO-LITHO., WASHINGTON, D. C.

(No Model.) 17 Sheets—Sheet 10.
G. E. HUNTER.
MECHANISM FOR TESTING WATCH BALANCES AND HAIR SPRINGS.
No. 490,202. Patented Jan. 17, 1893.

Witnesses
Chas. J. Williamson.
Henry C. Hazard.

Inventor
George E. Hunter, by
Dindle and Russell, his Attorneys

THE NORRIS PETERS CO., PHOTO-LITHO., WASHINGTON, D. C.

(No Model.)  17 Sheets—Sheet 11.
G. E. HUNTER.
MECHANISM FOR TESTING WATCH BALANCES AND HAIR SPRINGS.
No. 490,202. Patented Jan. 17, 1893.
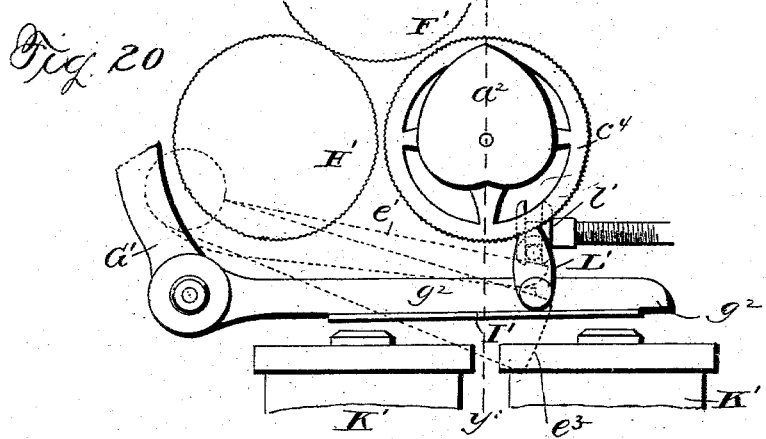
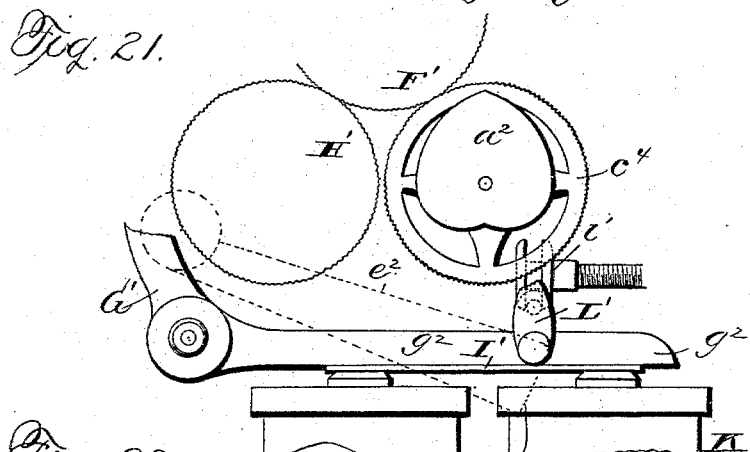
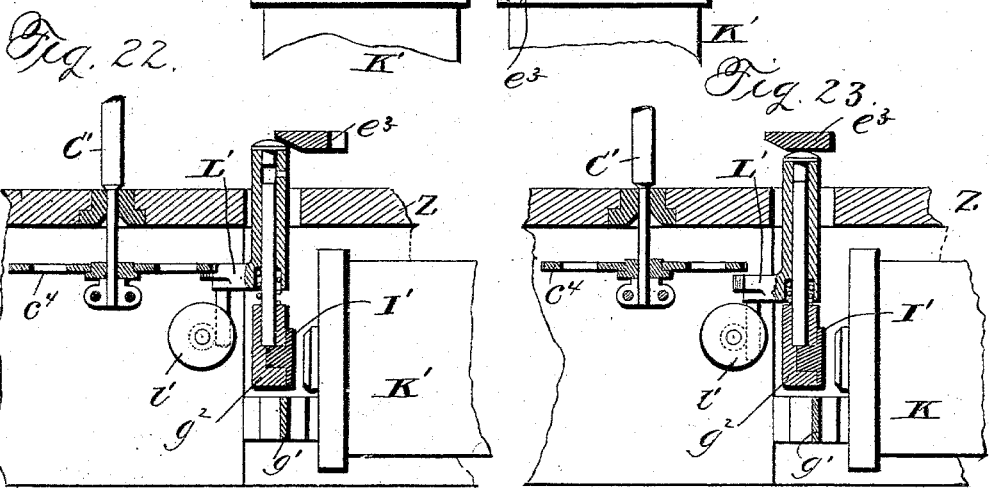
Witnesses
Chas. J. Williamson
Henry C. Hazard
Inventor
George E. Hunter, by
Brindle and Russell, his Attorneys (No Model.)

17 Sheets—Sheet 12.

G. E. HUNTER.
MECHANISM FOR TESTING WATCH BALANCES AND HAIR SPRINGS.

No. 490,202.  Patented Jan. 17, 1893.

Witnesses
Chas. J. Williamson.
Henry C. Hazard.

Inventor
George E. Hunter, by
Prindle and Russell, his Attorneys

THE NORRIS PETERS CO., PHOTO-LITHO., WASHINGTON, D. C.

(No Model.) 17 Sheets—Sheet 13.

G. E. HUNTER.
MECHANISM FOR TESTING WATCH BALANCES AND HAIR SPRINGS.

No. 490,202. Patented Jan. 17, 1893.

Witnesses
Chas. J. Williamson
Henry C. Hazard

Inventor
George E. Hunter, by
Dindle and Russell, his Attorneys (No Model.) 17 Sheets—Sheet 14.
G. E. HUNTER.
MECHANISM FOR TESTING WATCH BALANCES AND HAIR SPRINGS.
No. 490,202. Patented Jan. 17, 1893.

Witnesses
Chas. J. Williamson.
Henry C. Hazard

Inventor
George E. Hunter by
Crindle and Russell his Attorneys (No Model.)

17 Sheets—Sheet 16.

G. E. HUNTER.
MECHANISM FOR TESTING WATCH BALANCES AND HAIR SPRINGS.

No. 490,202. Patented Jan. 17, 1893.

Witnesses
Chas. J. Williamson.
Henry C. Hazard.

Inventor
George E. Hunter, by
Crindle and Russell, his Attorneys (No Model.) 17 Sheets—Sheet 17.
G. E. HUNTER.
MECHANISM FOR TESTING WATCH BALANCES AND HAIR SPRINGS.

No. 490,202. Patented Jan. 17, 1893.

Witnesses
Chas. J. Williamson.
Henry C. Hazard.

Inventor
George E. Hunter, by
Arindl and Russell, his Attorneys

UNITED STATES PATENT OFFICE.

GEORGE E. HUNTER, OF ELGIN, ASSIGNOR TO THE ELGIN NATIONAL WATCH COMPANY, OF CHICAGO, ILLINOIS.

MECHANISM FOR TESTING WATCH-BALANCES AND HAIR-SPRINGS.

SPECIFICATION forming part of Letters Patent No. 490,202, dated January 17, 1893.

Application filed July 2, 1892. Serial No. 438,778. (No model.)

*To all whom it may concern:*

Be it known that I, GEORGE E. HUNTER, of Elgin, in the county of Kane, and in the State of Illinois, have invented certain new and useful Improvements in Mechanism for Testing Watch-Balances and Hair-Springs; and I do hereby declare that the following is a full, clear, and exact description thereof, reference being had to the accompanying drawings, in which—

Figure 2:
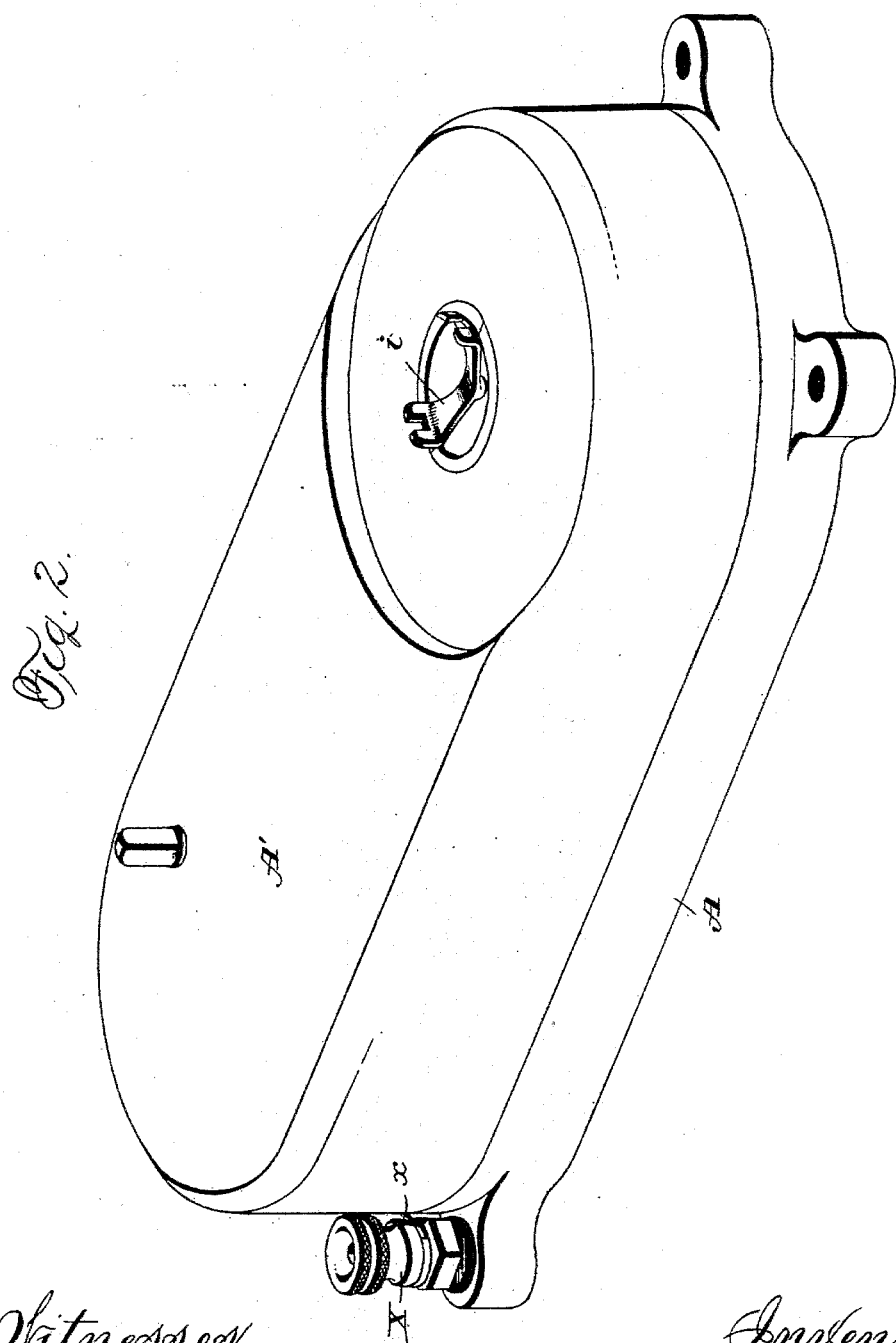
Figure 3:
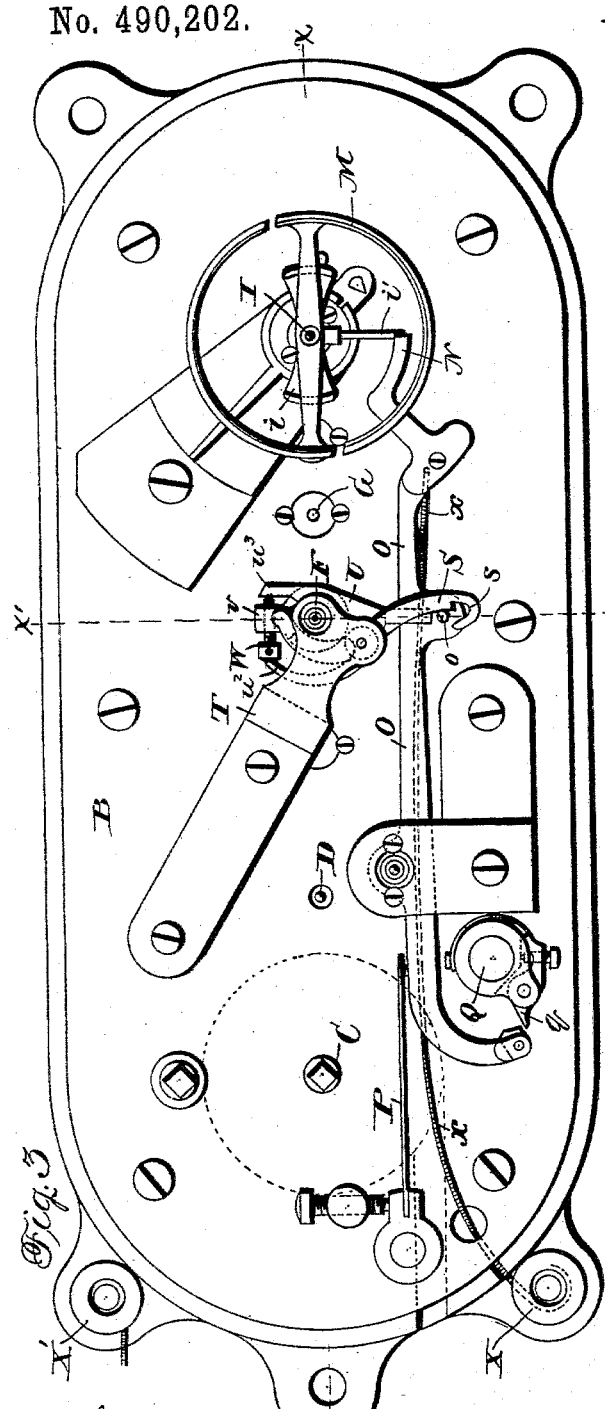
Figure 4:
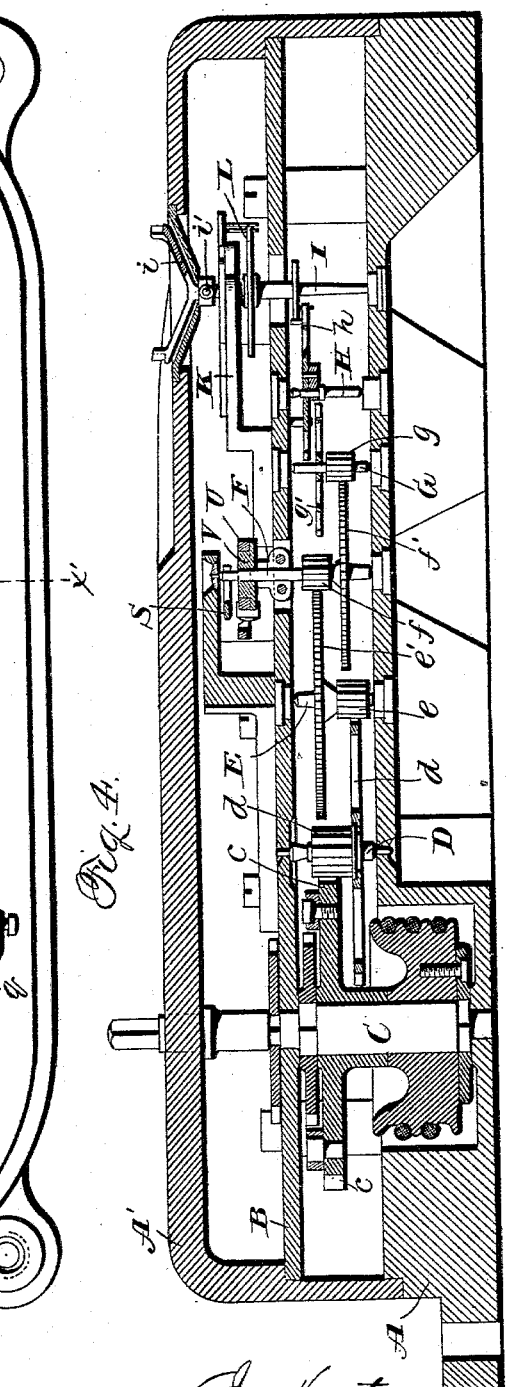
Figure 5:
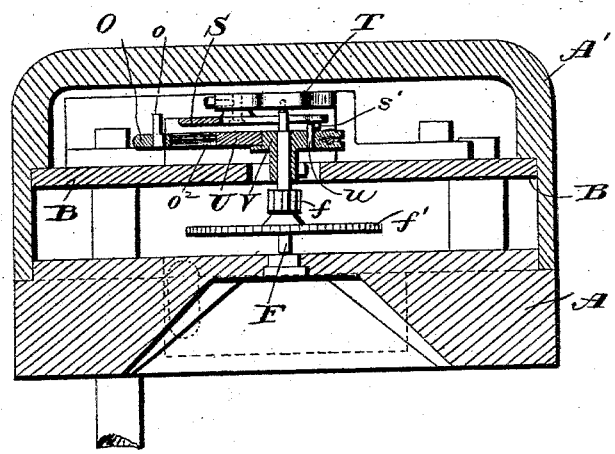
Figure 6:
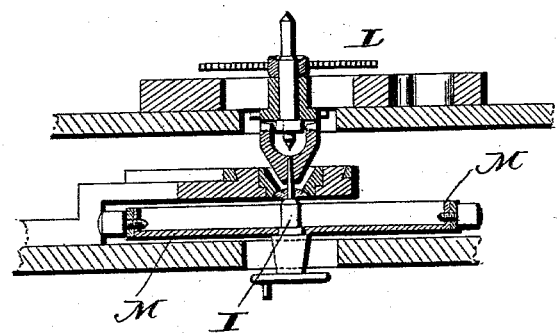
Figure 12:
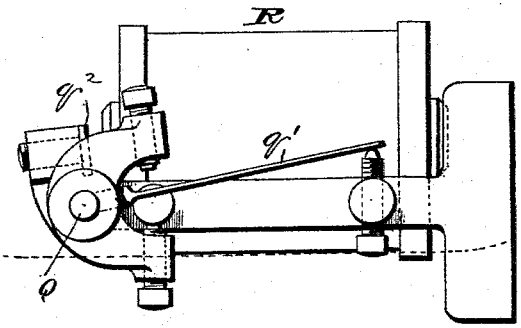
Figure 13:
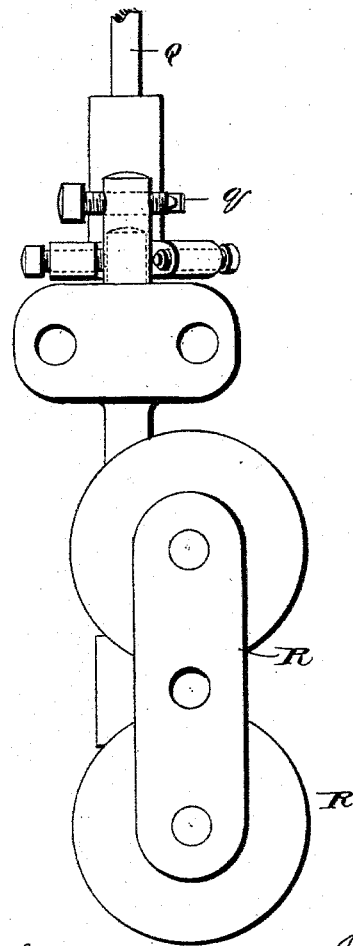
Figure 14:
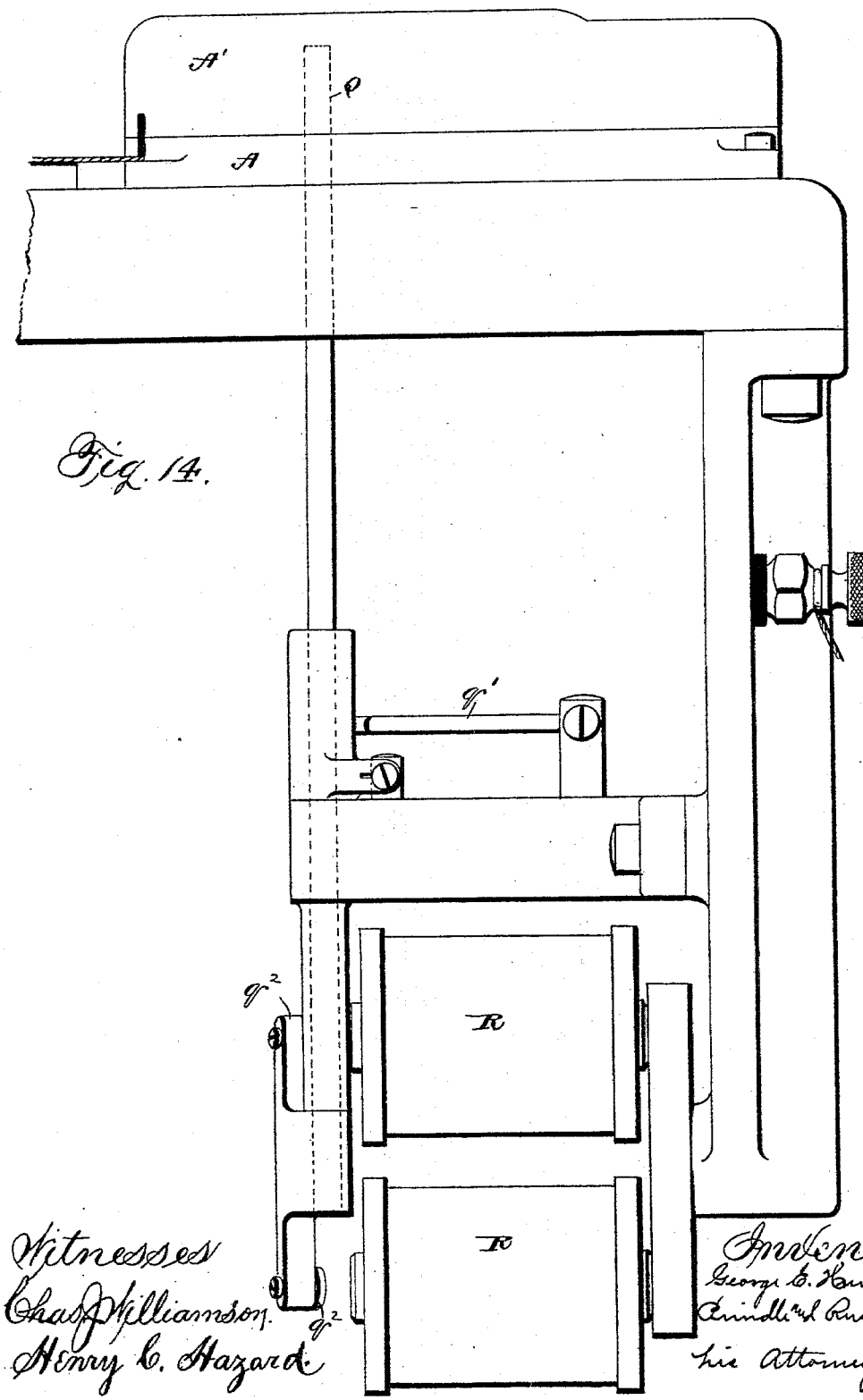
Figure 15:
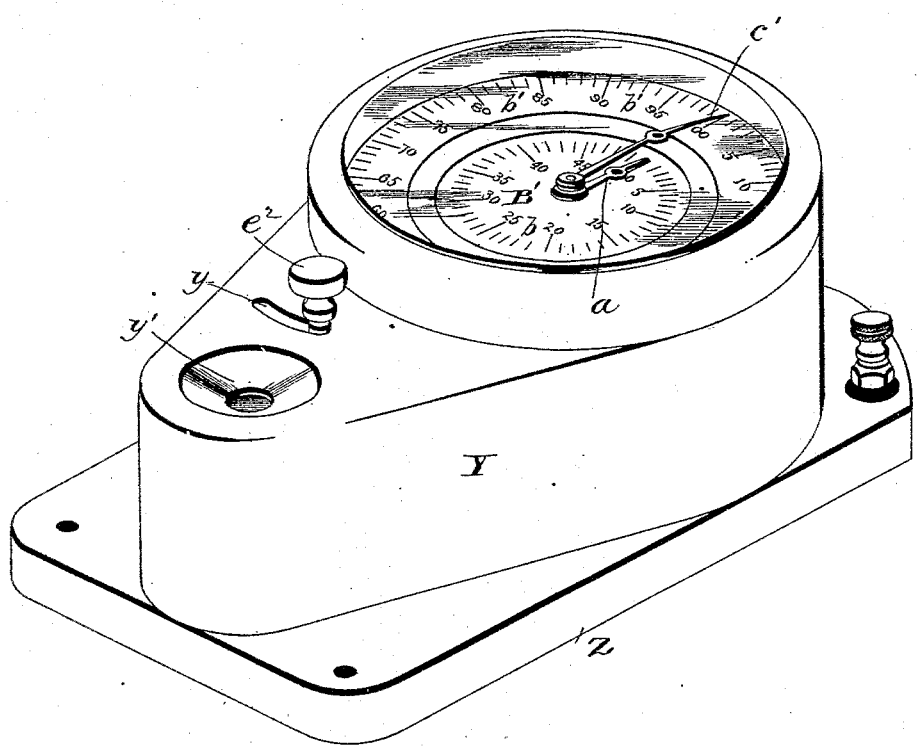
Figure 16:
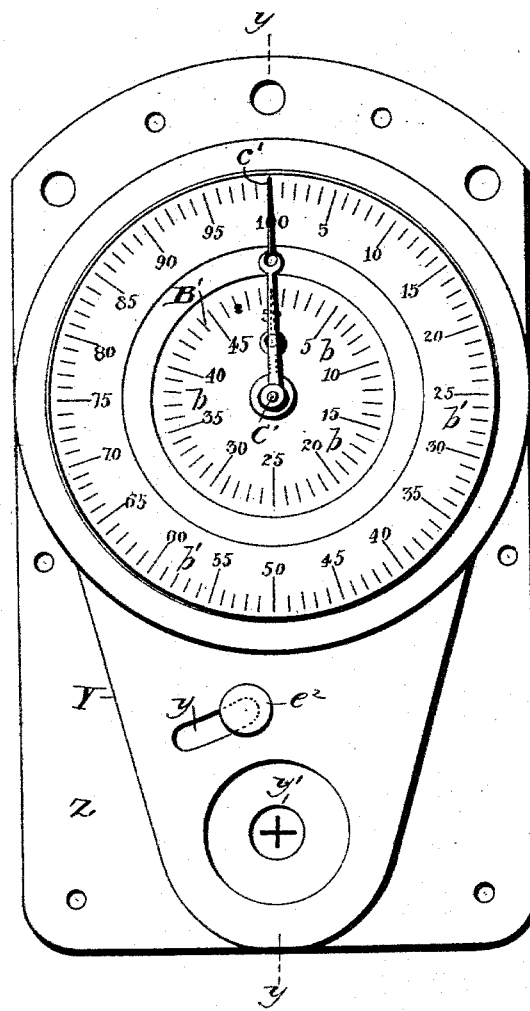
Figure 17:
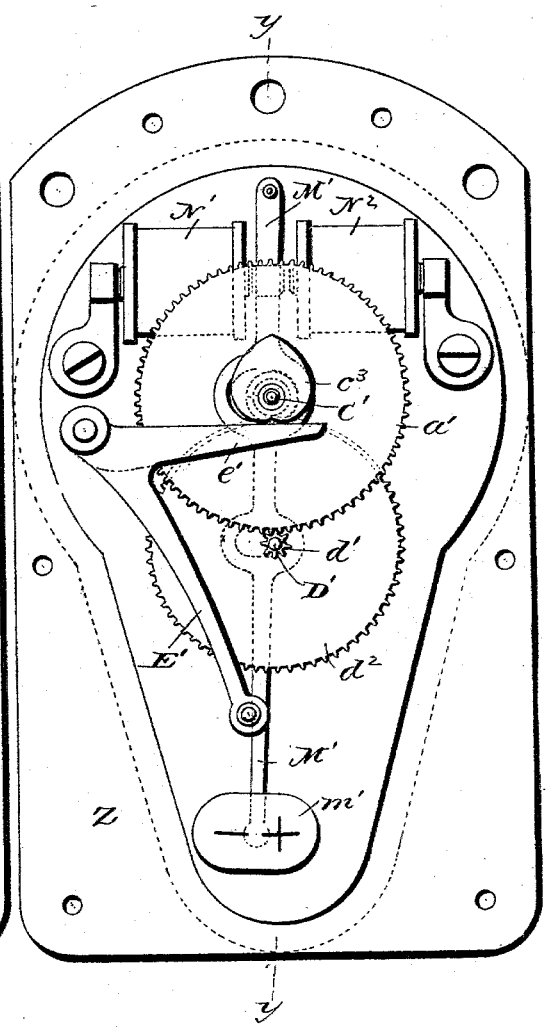
Figure 18:
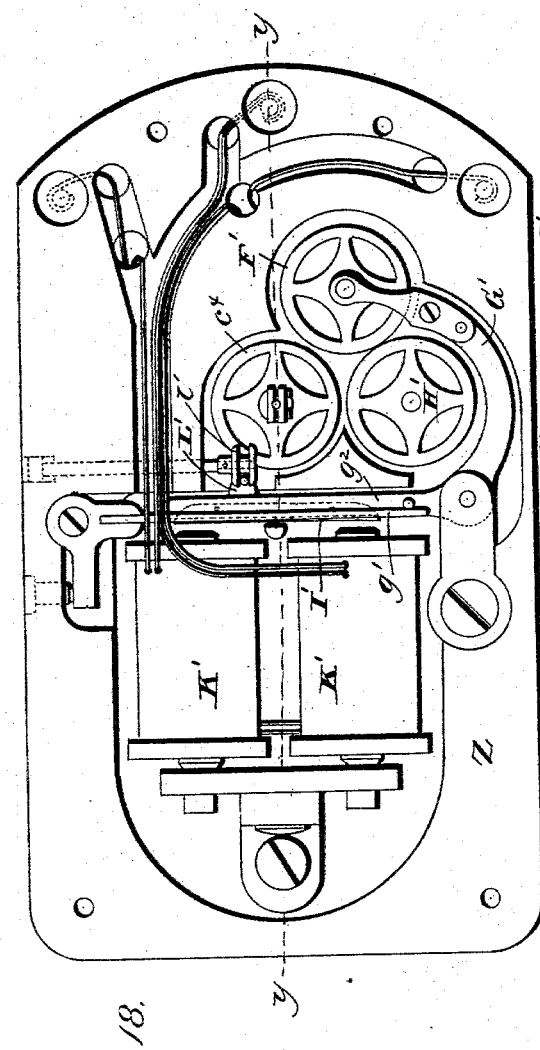
Figure 19:
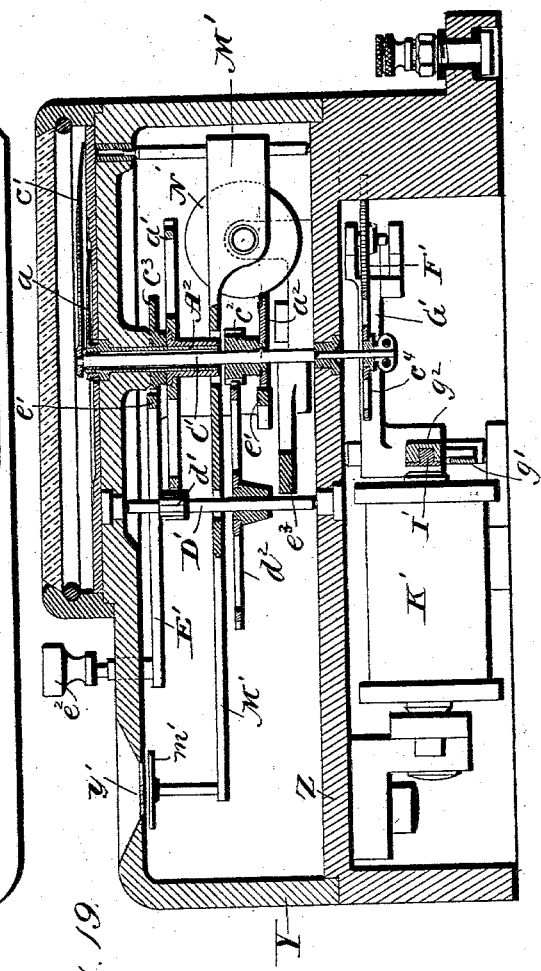
Figure 24:
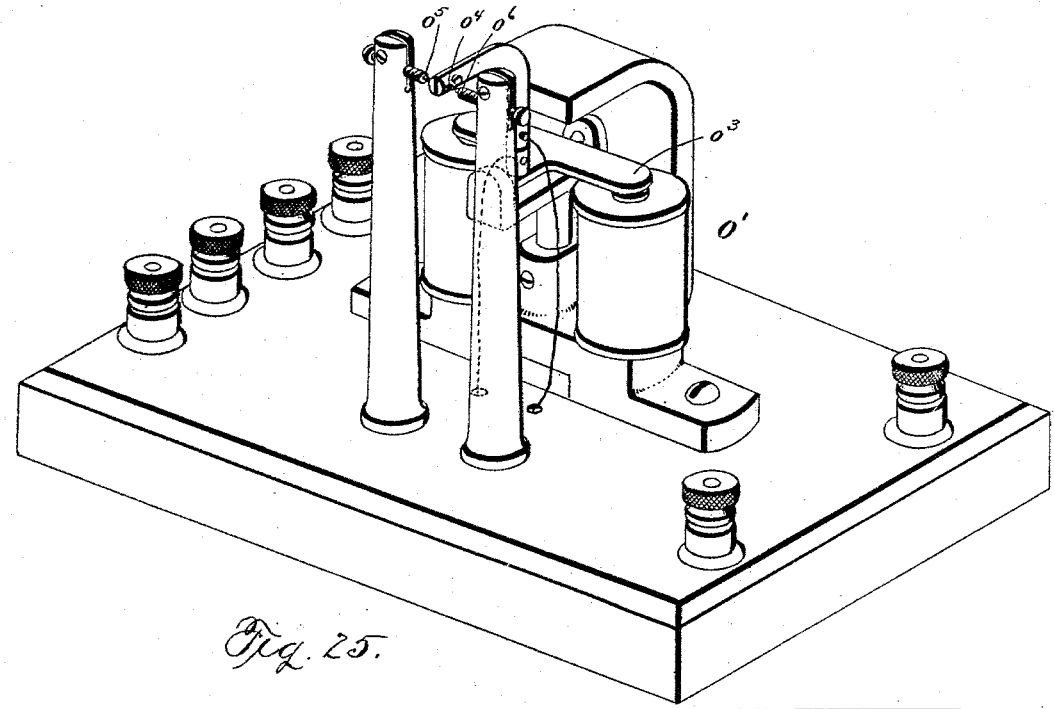
Figure 25:
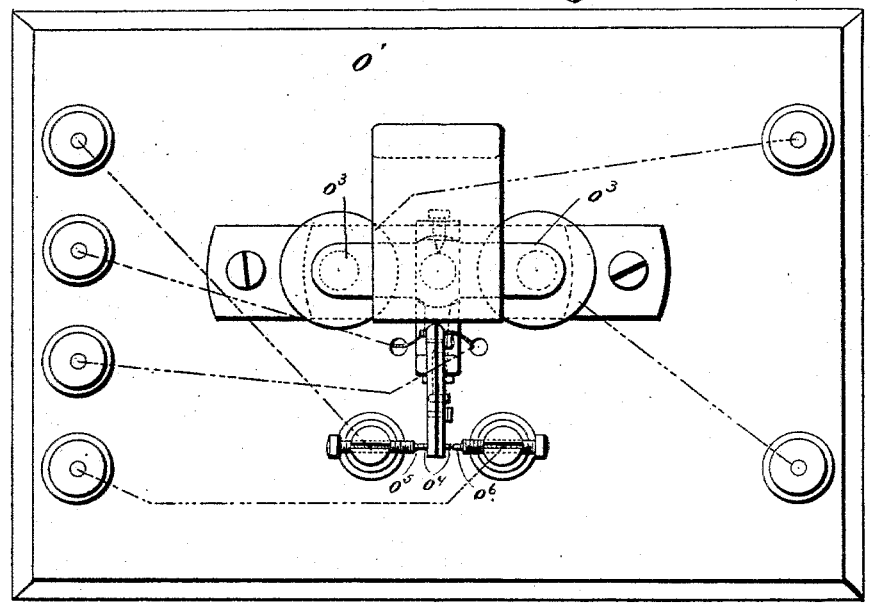
Figure 26:
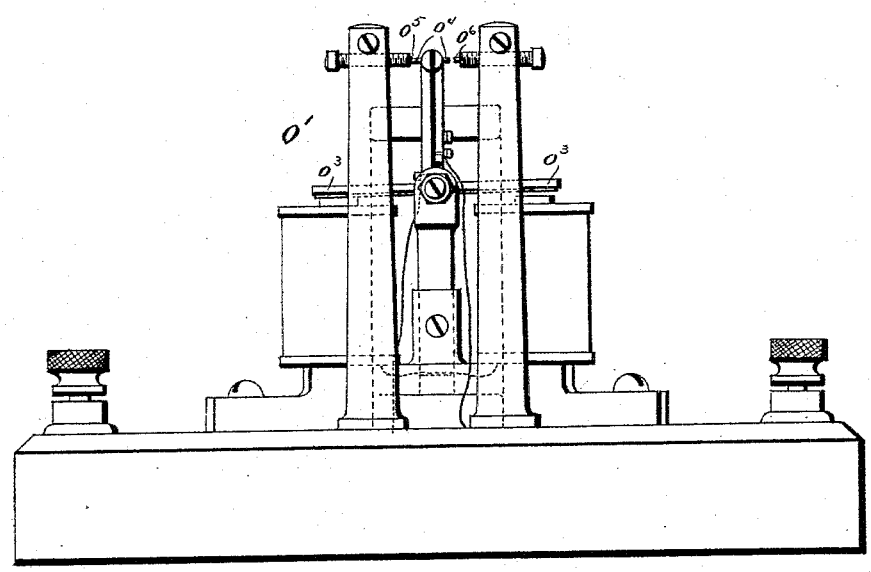
Figure 27:
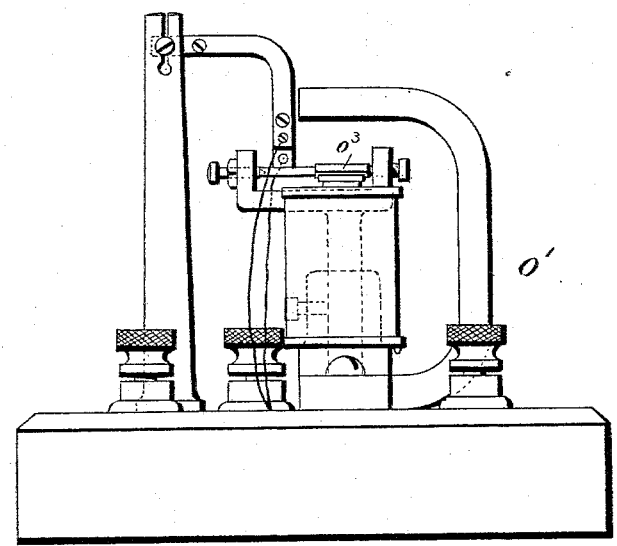
Figure 28:
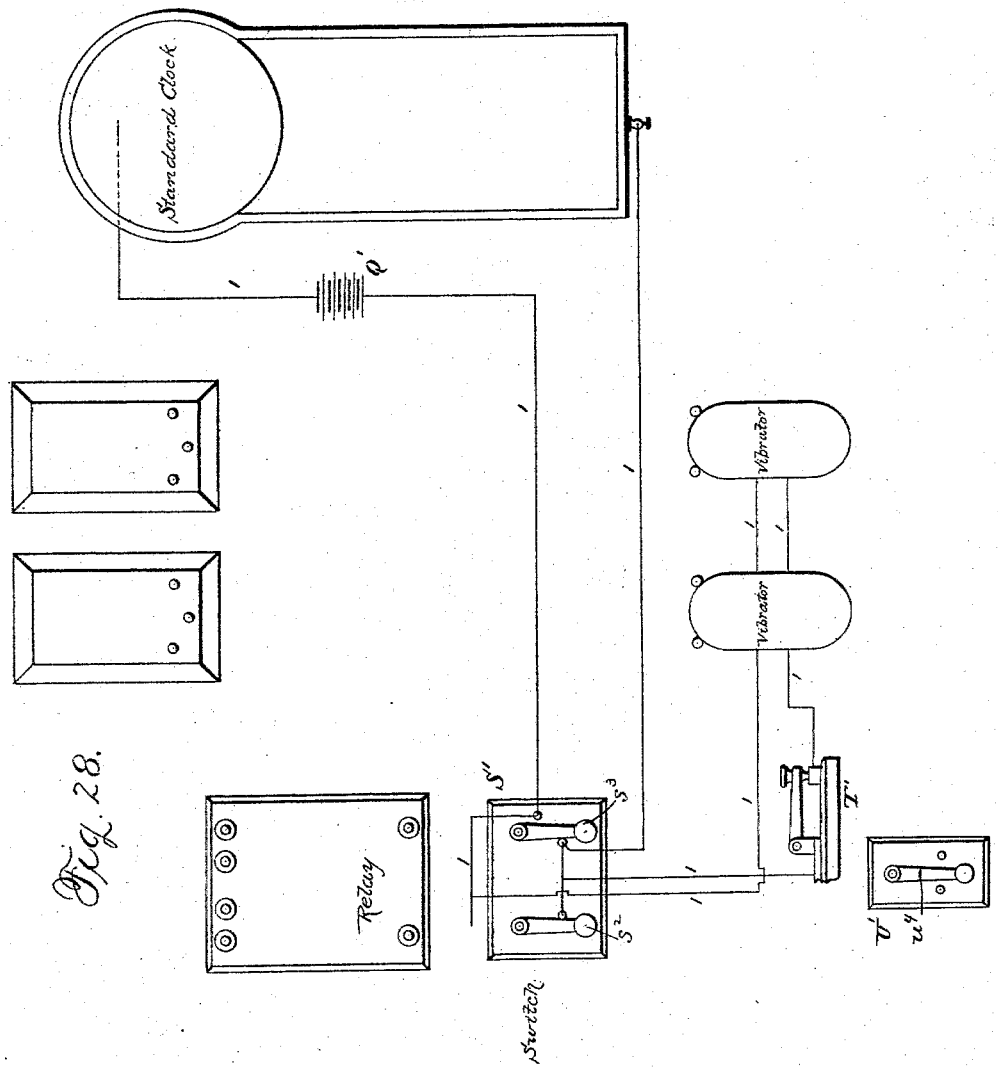
Figure 29:
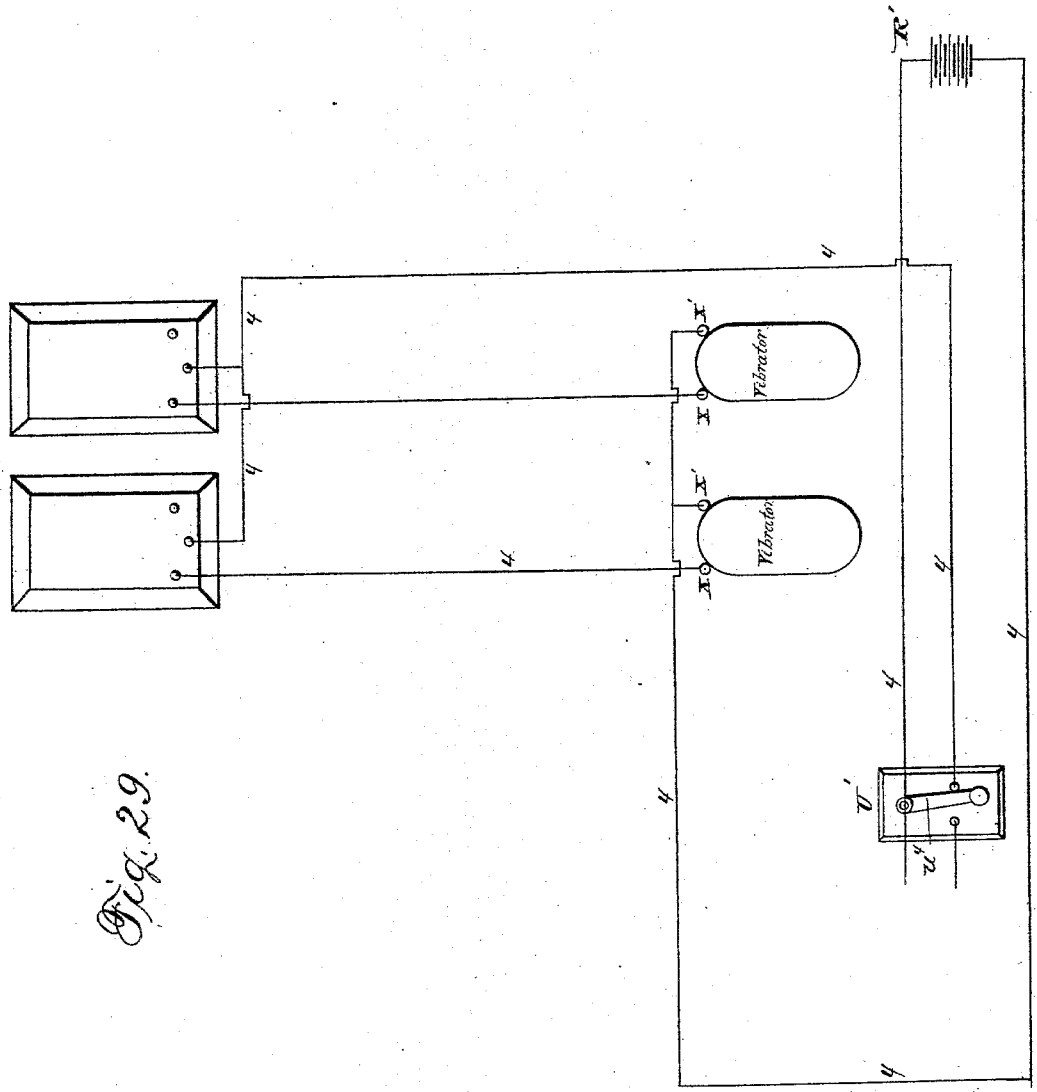
Figure 30:
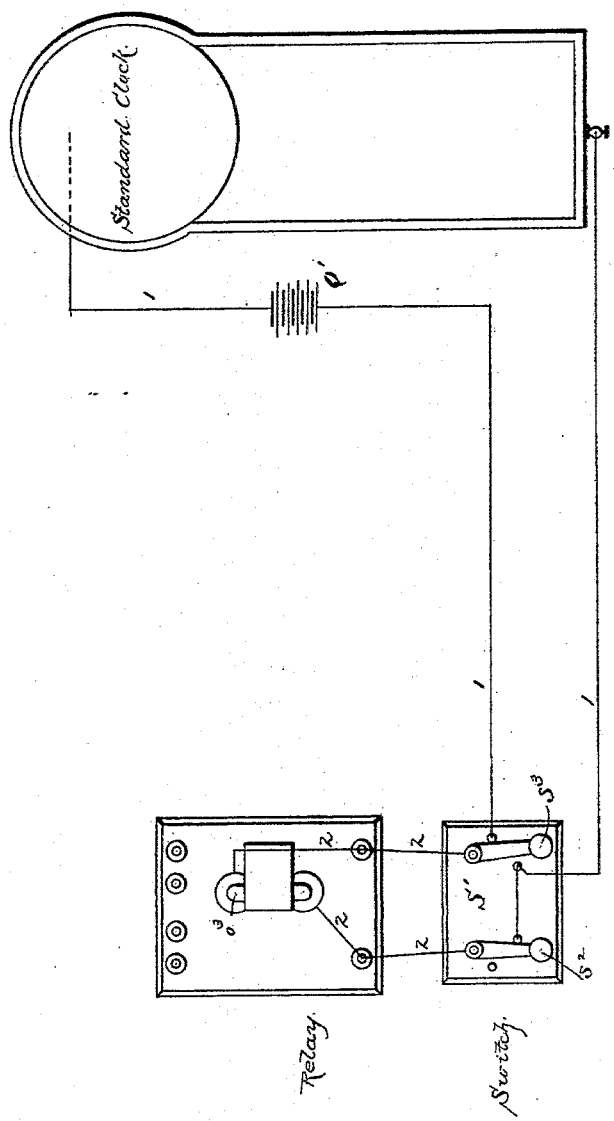
Figure 31:
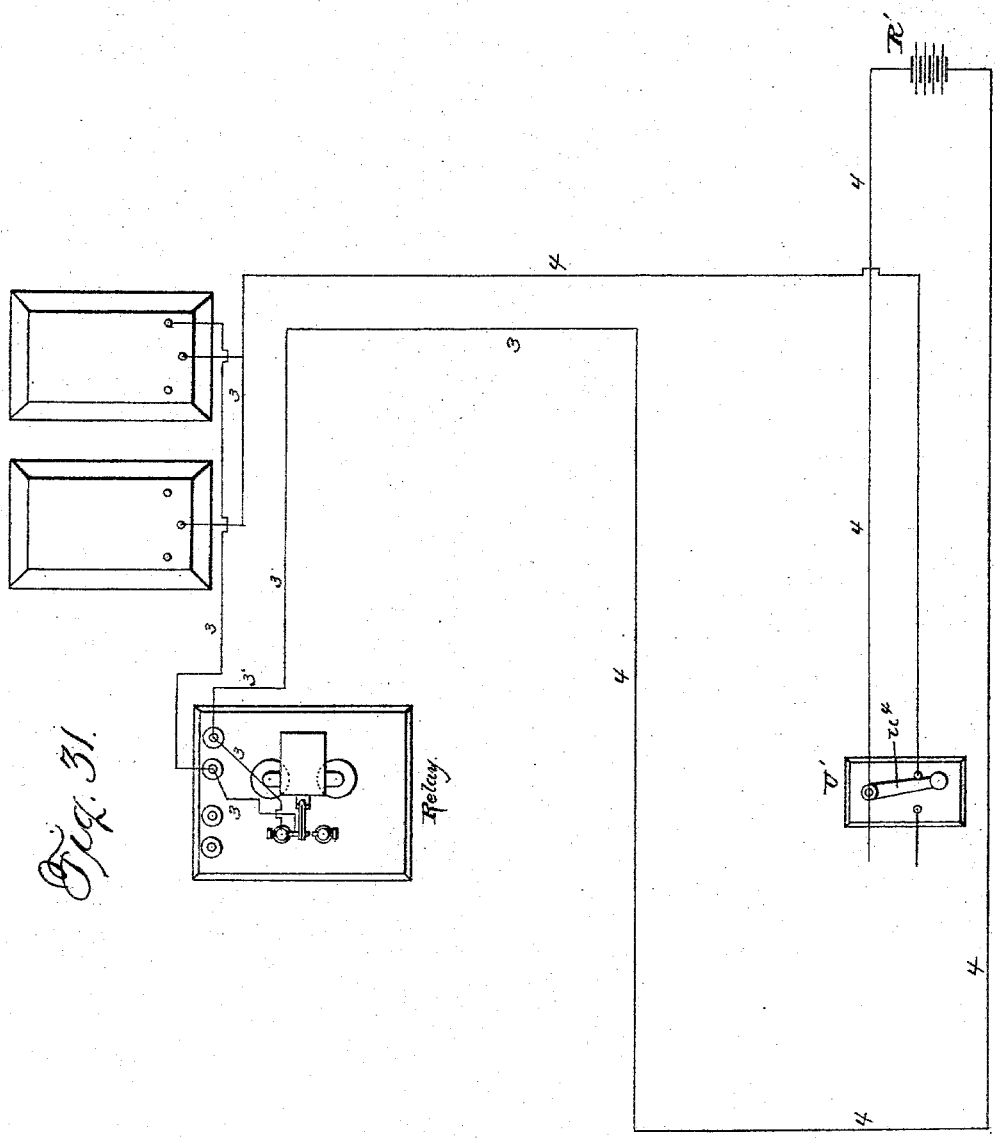

Figure 1 is a plan view of my apparatus in which is shown the relative arrangement of parts and the electric circuits connecting the same; Fig. 2 is a perspective view of the vibrator employed; Fig. 3 is a plan view of the operating mechanism of the same, the top of the casing being removed; Fig. 4 is a central longitudinal section of said vibrator upon line $x\ x$ of Fig. 3; Fig. 5 is a cross section of the same upon line $x'\ x'$, of Figs. 3 and 4; Fig. 6 is a longitudinal section of the balance arbor and shows the arrangement of parts when hair springs are to be tested; Fig. 7 is a plan view in outline of the locking and releasing mechanisms when the vibrating mechanism is locked from motion. Fig. 8 is a like view of the same after the balance staff has been released; Fig. 9 is an enlarged side elevation of the contact springs which are engaged by the contact pin of the balance staff; Figs. 10 and 11 are, respectively, views of the locking plate of the fourth arbor and of the detent actuated thereby, separated; Fig. 12 is a plan view of the mechanism used for actuating the pawl-shaft; Figs. 13 and 14 are, respectively, front and side elevations of the same; Fig. 15 is a perspective view of the registering mechanism preferably used; Fig. 16 is a plan view of the same; Fig. 17 is a plan view of said mechanism from the upper side with the top of the casing removed; Fig. 18 is a plan view of the lower side of the same; Fig. 19 is a longitudinal section upon line $y.\ y.$ of Figs. 16, 17, and 18; Fig. 20 is a plan view in outline of the arresting and releasing mechanism when occupying its normal or locked position; Fig. 21 is a like view of the same when the registering train is free to move; Fig. 22 is a section upon line $y'\ y'$ of Fig. 18 and shows the locking device in engagement with the main wheel of the register train; Fig. 23 is a like view of the same showing said device when released by the hands-setting lever before setting the hands to zero; Fig. 24 is a perspective view of the polarized relay employed; Fig. 25 is a plan view of the same; Fig. 26 is a front elevation of said relay. Fig. 27 is a side elevation of the same; Fig. 28 is a plan of the electric circuit connecting the clock with the magnet coils of the vibrator to release the balance and permit the same to vibrate; Fig. 29 is a like view of the circuit which enables the vibrator to set in operation the register; Fig. 30 is a plan view of the circuit through the clock and relay, and—Fig. 31 is a like view of the circuit through which the clock operates the register.

Letters of like name and kind refer to like parts in each of the figures.

My invention relates to the timing and adjusting of watch balances and hair spring before the same are placed in watch movements, and such invention consists in the apparatus employed, substantially as for the purpose hereinafter specified.

In the carrying of my invention into practice there is necessary a mechanism for vibrating a balance, or hair spring, an indicating or registering mechanism, a time mechanism and certain electrical appliances whereby the said mechanisms may be placed in operation and caused to co-operate so as to furnish accurate data as to the action of the parts being tested.

The time mechanism, which is preferably a standard clock, and the vibrating mechanism are each electrically connected by independent circuits with the indicating mechanism in such manner that either may set the latter in operation according to which first closes the circuit connecting it with such mechanism; or so that either will be effective to set said mechanism in operation should both circuits be closed simultaneously. The clock-controlled circuit is always closed at the expiration of a predetermined interval of time, preferably a minute, while the vibrator-controlled circuit is closed when the balance or spring being tested makes the number of vibrations that a perfect balance or spring would make in such interval. If, therefore, the balance or spring undergoing test be perfect, the two circuits will be closed simultaneously; if it be slow, then the vibrator controlled circuit will be closed after the closing of the clock-controlled circuit, while if it be fast, the vibrator controlled circuit will be closed first.

The vibrating mechanism is contained within a casing that is composed of a base section A and a top section A' that fits upon and is secured to the same, such casing having top, bottom and sides, and rounded ends. Midway between the base and top sections, A and A', respectively, is a plate B which is arranged parallel with said parts and between the same and said base are journaled the parts of an ordinary time train that consists of a main arbor C that has a toothed wheel $c$ and is caused to rotate by means of a weight-actuated drum, a second arbor D having a pinion $d$ and a toothed wheel $d'$, a third arbor E provided with a pinion $e$ and toothed wheel $e'$, a fourth arbor F having a pinion $f$ and toothed wheel $f'$, a fifth arbor G provided with a pinion $g$ and escape wheel $g'$, a sixth arbor H carrying a pallet lever $h$ and a balance arbor or staff I which staff is journaled within said lower section, extends through said plate and has its upper end journaled in a bridge K that is secured upon the latter.

When used for testing balances, the staff I is provided with a standard hair spring L that is located below the bridge K, and upon its upper pivot carries a crotch $i$ that is adapted to receive a balance M, and support the same in proper position, when it becomes a part of and completes the time train. When the vibrator is employed for testing hair springs a standard balance is secured upon said staff below said bridge, and the upper end of the latter adapted to receive a hair spring L.

When a spring or balance has been placed in position it is desired that the balance staff should be capable of instant vibration, and that when it has vibrated a predetermined number of times, it shall complete an electric circuit at the point from which it started. To effect this there is secured to said staff, above the plate B, a radial pin $i'$, and within the plane of vibration of such pin are two flat springs N and N that are secured upon one end of a lever O which is pivoted near its opposite end and is adapted to be moved upon its pivot so as to cause said springs to be placed within the track of said pin, or to remove them from such track. Said springs are the terminals of an electric circuit and are arranged with their outer ends nearly parallel and separated by a distance less than the diameter of said pin so that when they are moved inward, the latter will pass between and engage with said springs, closing the circuit and arresting the motion of the balance staff.

The lever O is held normally in position to arrest motion of the balance staff I by means of a spring P that is arranged to engage with and press outward upon its rear end, but is moved to the opposite limit of its motion by means of a shaft Q which is journaled vertically within the base section A and plate B and at its upper end is provided with a pawl $q$ that when such shaft is rotated in one direction is adapted to engage with the rear end of said lever and move the same inward, while when said shaft is rotated in an opposite direction said pawl will trip over said lever end. Said shaft is held at the rearward limit of its rotary motion by means of a radially arranged spring $q'$, and is moved in an opposite direction by an armature $q^2$ which is secured radially upon the shaft and is acted upon by two electro-magnets R and R that are suitably arranged with reference thereto. When the lever O has been moved to position to release the balance staff, it is locked in such position by means of a detent S that is pivoted upon a bridge T near the center or fourth arbor F and at one end is provided with a notch $s$ which is adapted to engage with a pin $o$ that projects upward from said lever. The shape of the notch is such as to cause the pin to automatically move said detent into position for engagement as said lever is turned to release the balance staff. At the completion of the predetermined number of vibrations of the balance staff the detent S is released from engagement with the pin $o$ and the lever O automatically returns to its normal position and thus causes the springs N and N to engage with the pin $i$ and arrest the motion of said staff. Such release is effected by means of a plate U which is secured upon and rotates with the fourth arbor F and is provided with a pin $u$, that at the desired instant, engages with a similar pin $s'$ upon said detent and moves the latter in the direction necessary for disengagement from said pin $o$. At the instant when the lever O returns to its normal position a shoulder $u'$ upon the plate U engages with a lug $o^2$ upon said lever and operates to arrest the motion of the time train and to thus relieve the balance staff from all injurious shock or strain. In order that the engagement between said plate and lever may be effected at the precise instant desired, a cylindrical plate V is fastened upon the arbor F upon which said plate U is fitted so as to embrace about three-fourths of its periphery and be held thereon by friction. One side of the plate U is made open as shown, and is provided with two arms $u^2$ and $u^3$ between which is placed a screw W that has its ends in engagement with the contiguous faces of said ends and its threaded body contained within a threaded lug $v$ which is formed upon and extends radially from said plate V. As thus arranged by turning said screw it will be moved lengthwise through said boss and cause said plate U to be turned upon said plate V so as to change the position of the shoulder $u'$ with relation to the arbor F. The springs N and N, not only act as stops to arrest the motion of the balance arbor, but also as circuit closers, for which purpose the lower spring is insulated from the other and connected electrically with an insulated binding post X by a wire x, while the upper spring is secured directly upon the lever O and through the same and the casing, or by any usual means, is in connection with a second binding post X'. As thus arranged it will be seen that when the pin $i$ passes between the ends of said springs an electric connection is instantly produced.

The registering mechanism is inclosed within a casing Y which has the form shown in Figs. 15, 16 and 17 and is supported and secured upon a hollow base Z that in turn rests upon and is attached to a bench or other suitable support. Within said casing is journaled a vertical, hollow arbor $A^2$, which upon its upper end carries a hand $a$ that by the rotation of said arbor will be caused to move over a circular dial B' which is secured upon the upper side of the casing and is provided with fifty equal divisions $b$, $b$, &c. Within said hollow arbor is journaled an arbor C' which extends downward into the hollow base Z and upon its upper end has secured a hand $c'$ that is longer than said hand $a$ and when said arbor is rotated travels over a second series of divisions $b'$, $b'$, &c, numbered from one to one hundred which are provided upon said dial.

Journaled at one side of and parallel with the arbors $A^2$ and C' is an arbor D' that carries a toothed wheel $d^2$ and a pinion $d'$, the first of which parts meshes with and receives motion from a pinion $c^2$ that is secured upon said arbor C', while said pinion $d'$ meshes with and imparts motion to a toothed wheel $a'$ which is carried by said arbor $A^2$, the relative dimensions of said pinions and wheels being such as to cause the shorter hand $a$ to move forward one degree for each complete rotation of the longer hand $c'$.

The engagement between the pinion $c^2$ and the arbor C' and the wheel $a'$ and the arbor $A^2$ is produced by friction so that each arbor is capable of being independently turned in order to set the hands at zero. This is effected by means of two heart-shaped cams $a^2$ and $c^3$ which are secured, respectively, upon said arbors $A^2$ and C' and are simultaneously acted upon by the arms $e'$ and $e'$ of a lever E' that is journaled within the casing and operated by means of a knob $e^2$ that projects through a slot $y$ in the upper side of the casing Y.

The register mechanism is driven by any suitable motor through the arbor C' for which purpose there is secured to the lower projecting end of the latter a toothed wheel $c^4$ that is adapted to be engaged by an intermediate toothed wheel F' which is pivoted upon one end of a pivoted bar G' and is in constant engagement with a motor driven wheel H' the arrangement being such as to enable said wheels $c^4$ and F' to be engaged or disengaged by the movement of said bar upon its pivotal bearing. The bar G' is by means of a spring $g'$ held normally in such position as to cause the wheels $c^4$ and F' to be disengaged and is moved in an opposite direction by means of an armature I' which is secured to an arm $g^2$ that extends laterally from said bar. Said armature is moved by means of an electromagnet K' in the usual way, but for purposes hereinafter stated, each coil of such magnet is made double so that when currents of electricity having equal strength are passing at the same time and in opposite directions through each wire they will neutralize each other and produce no magnetism, but if one current is interrupted, then the other current will act with full effect and the armature will be attracted.

It is necessary that the registering mechanism shall be locked from movement when not intentionally caused to operate, for which purpose there is employed a detent L' that is arranged to be moved vertically into and out of engagement with the teeth of the wheel $c^4$ of the arbor C' and by spring pressure, is held normally at the upper limit of its motion in engagement with said wheel. When the hands are being set at zero, said detent is moved out of engagement by means of an inclined portion of the arms $e^2$ of the cam lever E' which arm passes over the end of said detent and moves the same downward just before the impinging of the arm $e'$ upon the cam $c^3$. As soon as said cam lever is released and returns to its normal position, said detent automatically engages again with said wheel $c^4$. A laterally adjustable clamp $l'$ engages with said detent and enables it to be moved so as to cause it to exactly coincide with the teeth of said wheel. To permit of the disengagement of said detent at the instant a connection is made between the motor and registering mechanism, it is secured upon, and supported by the arm $g^2$ of the bar G', and with such arm is moved horizontally away from the wheel $c^4$ by the action of the electro-magnet upon the armature I'.

In order that it may be indicated which of the two currents sets the registering mechanism into operation, there is pivoted at one end within one end of the casing $y$ a bar M' which upon its opposite, free end carries a plate or dial $m'$ that by movement of said lever upon its pivotal bearing may be caused to move horizontally to a limited distance beneath a glazed opening $y'$ in the top of said casing. Upon such dial are the conventional signs for the terms plus and minus ($+$ and $-$) and by the movement of said bar to the limit of its motion in one direction one of said signs will be brought into sight, while when the bar is in its other position, the other sign is in view. Two electro-magnets N' and $N^2$ act upon the bar M' one of which magnets is placed upon each side thereof near its pivoted end and opposite to an armature. Each of these coils forms part of one of the electric circuits of the magnet K' and it will be obvious that, whichever one (N' or $N^2$) receives the current first, it will be able to hold the bar M' in opposition to the magnetism induced in the other coil by a current of the same strength, and the sign then exposed will indicate which circuit was first closed. Another portion of the system is a polarized relay O' which has the usual construction, and is connected electrically—through a standard clock P'—with a battery Q' so as to enable such clock to control and cause its armature $o^3$ to close or open either of two circuits, and thus connect either of two sets of registers with another battery R'.

The mechanisms described may occupy any desired relative positions, but as shown in Fig. 1. the arrangement is preferably as follows, viz:—Two or more vibrators for each set are arranged side by side upon a suitable support, and a like number of registers is located conveniently near, preferably upon the opposite side of a bench or table. Midway between said vibrators and registers is placed the polarized relay, a double switch S' having two levers $s^2$ and $s^3$ is placed in front of said relay, a circuit-closer T' having two keys $t'$ and $t^2$, is next in order and a switch U' having a single lever $u'$ is placed in front of said circuit closer. The standard clock P' has a mercurial contact mechanism $p'$ at the lower end of its pendulum which operates to connect electrically with a battery Q', the magnets R and R that actuate the pawl shafts Q and Q of one set of vibrators, such connection being made through the switch S' and circuit closer T' as shown in Fig. 28, and for convenience being designated No. 1. From the switch a second circuit, No. 2, branches off from No. 1 and extends to each of the magnet coils of the relay O', as seen in Fig. 30, by which means a current from the battery Q' may be caused to pass through either of said coils and thus move the armature to cause its contact piece $o^4$ to close a third circuit No. 3, which circuit No. 3, shown in Fig. 31 is formed by a wire that extends from the battery R', to the relay O' where it is connected with one of the fixed contacts $o^5$ and $o^6$ of said relay and with the contact $o^4$ of its armature, and from thence passes to and includes the magnet K' of each register of the set and from thence through the switch U' back again to said battery, while a fourth circuit No. 4 extends from the battery R' through the switch U' to the registers, then around the coils of each magnet, thence to each vibrator, and from thence back to said battery, the arrangement being such that each register is connected electrically with one vibrator of the set so that while the same circuit is employed for all of each set, the action of each is independent of the others. The operator now places balances or hair springs in position in one set of vibrators, and then manipulates the key $t'$ of the circuit closer T' which causes the next beat of the clock to send a current through the clock circuit No. 1 so as to release the time train of each vibrator and permit the same to instantly commence movement, after which, by means of the switch U', the battery R' is thrown into circuit upon the same side of the apparatus in readiness for use when needed. Just before the expiration of one minute, the operator moves the lever $s^3$ of the switch S' so as to connect the clock with the relay—by circuit No. 2.—when the last beat of the minute from said clock sends a current from the battery Q' through the magnet coils of said relay and closes the circuit No. 3 between the battery R' and the registers upon that side through the contact $o^5$ of said relay. If either of the balances or hair springs being tested, is slow, the hands of the connected register will instantly commence to turn and will continue in motion until the balance has completed three hundred vibrations, when the contact springs N and N will be moved into engagement with the pin of the balance staff and closing circuit No. 4 between the vibrator and register will neutralize the current of circuit No. 3 upon the magnets of said recorder and operate to instantly arrest the motion of its hands. The position of said hands will indicate the number of seconds of variation of the balance, or spring in twenty four hours and the appearance of the —, or minus sign will show that said balance or spring is slow. Should a balance or spring be fast the vibrator controlled circuit No. 4 will be closed at the expiration of the time required for the balance to make three hundred vibrations, and the hands of the register will be instantly started and continue to run until their motion is arrested by the clock circuit No. 3 at the expiration of one minute, when the +, or plus sign will be shown, and the position of said register hands will indicate the number of seconds which the balance or spring is fast in twenty four hours. If the balance or spring be perfect, then it will complete its three hundred vibrations exactly in a minute, and accordingly the vibrator controlled circuit will be closed simultaneously with the clock-controlled circuit, and since the two currents flowing through the coils of the magnets K', K' will neutralize each other the register will not be set in motion.

The method practiced in using the herein-described mechanism is not claimed herein but is made the subject matter of another application filed July 2 1892: Serial No. 438,778.

Having thus described my invention what I claim is.

1. As an improvement in apparatus for testing balances and hair springs in combination, a balance or hair spring vibrating mechanism, a standard time piece and an indicating mechanism connected with both the time piece and with the vibrating mechanism to show the relation between them at the end of a predetermined interval of time, substantially as and for the purpose set forth.

2. As an improvement in apparatus for testing balances and hair springs, in combination, a balance or hair spring vibrator, a standard time piece, an indicating mechanism, and electrical connections between each of the former and said indicating mechanism, whereby the latter may have its movements, controlled by either of the others, substantially as and for the purpose shown.

3. As an improvement in apparatus for testing balances and hair springs, in combination, a balance or hair spring vibrator, a standard time piece, a circuit connecting these two, whereby the time piece can start the vibrator, and a register in electrical connection with and having its movements controlled by said vibrator and said time piece, substantially as and for the purpose specified.

4. As an improvement in apparatus for testing balances and hair springs, in combination, a balance or hair spring vibrator, a standard time piece, an electric circuit connecting these two, whereby the time piece can start the vibrator, an indicating mechanism, an electric circuit having a make and break device controlled by the time piece to start said indicating mechanism and a third circuit having a make and break device controlled by the vibrator by which said mechanism may also be started, substantially as and for the purpose shown and described.

5. As an improvement in apparatus for testing balances and hair springs, in combination, a balance or hair spring vibrator, a standard time piece, an electric circuit connecting these two, whereby the time piece can start the vibrator, an indicating mechanism, an electric circuit having a make and break device controlled by the time piece to start said indicating mechanism, a third circuit between the vibrator and the indicating mechanism and the vibrator stopping device adapted to make and break said third circuit, substantially as and for the purpose described.

6. As an improvement in apparatus for testing balances and hair springs, in combination, a vibrating mechanism, a standard clock, an electric circuit connecting these two whereby the time piece can start the vibrator, an indicating mechanism, an electric circuit having a make and break device controlled by the time piece to start said indicating mechanism, a third circuit between the vibrator and the indicating mechanism and the circuit closer carried by the balance arbor of the vibrator, substantially as and for the purpose set forth.

7. As an improvement in apparatus for testing balances and hair springs, in combination, a balance or spring vibrating mechanism, a standard time piece, an indicating mechanism connected with both of the former and adapted to be actuated by either and means to indicate by which of the same it is actuated.

8. As an improvement in apparatus for testing balances and hair springs, in combination, a balance or spring vibrating mechanism, a standard time piece, an indicating mechanism, an electric circuit connecting each of the former with said indicating mechanism to enable either to actuate it, and means to indicate which does actuate it, substantially as and for the purpose shown.

9. As an improvement in apparatus for testing balances and hair springs in combination with the doubly coiled electro-magnet, an electro magnet in circuit with each of said coils, an armature subject to the influence of both of the latter magnets, and an independent circuit closing device for each circuit through the double coils, substantially as and for the purpose specified.

10. As an improvement in apparatus for testing balances and hair springs in combination with a magnet adapted to be traversed by opposing electric currents and the mechanism to be influenced by the same, when but one current is traversing it, an indicator to denote which current is the traversing current and an independent circuit closing device to establish each current, substantially as and for the purpose set forth.

11. As an improvement in apparatus for testing balances and hair springs in combination with the doubly coiled electro magnet, an electro magnet in circuit with each coil of the same, the indicator whose movements are controlled by the last named magnets and an independent circuit closing device to close the circuit through each of the double coils, substantially as and for the purpose described.

12. As an improvement in apparatus for testing balances and hair springs in combination a balance or spring vibrating mechanism, a standard time piece, an indicating mechanism, the magnet for controlling the operation of the latter, in a circuit controlled by the time piece and one controlled by the vibrator, another magnet in each of said circuits and an indicator adapted to be actuated by either of said last named magnets, substantially as and for the purpose shown and described.

13. A system for testing balances and hair springs, comprising a standard time piece, two sets of vibrators and indicators, a polarized relay, a circuit including the indicators and the relay and a circuit between the time piece and the relay, substantially as and for the purpose specified.

14. A system for testing balances and hair springs comprising a standard time piece, two sets of vibrators and indicators, a polarized relay, a circuit including the said time piece, and the vibrators, a circuit including the said time piece and the relay, a circuit including the relay and the indicators and a circuit including the indicators and the vibrators of a set, substantially as and for the purpose described.

15. In combination with a train for vibrating a balance wheel or hair spring, a stopping device adapted to operate on the balance arbor and on an arbor intermediate it and the going arbor, substantially as and for the purpose shown and described.

16. In combination with a train for vibrating a balance wheel or a hair spring, a pivoted lever for stopping the same adapted to operate simultaneously upon the balance arbor and upon an arbor intermediate it and the going arbor, substantially and for the purpose shown—

17. In apparatus for testing balances and hair springs in combination with a train for vibrating a balance or a hair spring the device for stopping the same and controlling an electric circuit and an indicating mechanism in said circuit substantially as and for the purpose described—

18. In apparatus for testing balances and hair springs in combination with a train for vibrating a balance or a hair spring, a pivoted arm adapted to simultaneously stop the same and close an electric circuit, and an indicating mechanism in said circuit substantially as and for the purpose shown and described—

19. In combination with a train for vibrating a balance or a hair spring, one of whose arbors carries a plate, an arm movable into and out of engagement with said plate to stop the train and a locking device to hold such arm out of engagement with the same—

20. In combination with a train for vibrating a balance or a hair spring, a pivoted arm movable into and out of the path of a pin carried by the balance arbor to stop and allow the same to start and to close and open an electric circuit, substantially as and for the purpose set forth.

21. In combination with one of the wheels of a registering mechanism, a detent to lock said wheel, the wheel movable into and out of engagement with the latter for communicating motion from a motor to it, and the mechanism for moving said movable wheel into and out of its engagement and moving said detent into and out of locking engagement, substantially as and for the purpose shown—

22. In combination with one of the wheels of a registering mechanism and the means for setting the hands thereof to zero, a detent to lock said wheel, the wheel movable into and out of engagement with the latter for communicating motion from a motor to it, and the mechanism for moving said movable wheel into and out of its engagement, such mechanism and the hands setting means both operating to move said detent into and out of locking engagement, substantially as and for the purpose specified—

In testimony that I claim the foregoing I have hereunto set my hand this 23d day of May, 1892.

GEORGE E. HUNTER.

Witnesses:
GEO. S. PRINDLE,
W. H. CLOUDMAN.